United States Patent [19]
Funk

[11] Patent Number: 5,148,956
[45] Date of Patent: Sep. 22, 1992

[54] ARTICLE CARRIER

[76] Inventor: Gerald D. Funk, Box 475, Dinsmore, Saskatchewan, Canada, S0L 0T0

[21] Appl. No.: 668,265

[22] Filed: Mar. 12, 1991

[51] Int. Cl.⁵ .................................................. A45F 3/04
[52] U.S. Cl. .................................... 224/209; 224/214; 224/250; 119/96; 119/101; 294/151; 294/157
[58] Field of Search ............... 224/157, 158, 159, 160, 224/209, 214, 250, 259, 260, 246, 261, 263, 272; 119/96, 101, 102; 297/464, 465; 294/140, 149, 151, 152, 155, 157

[56] References Cited

U.S. PATENT DOCUMENTS

| | | | |
|---|---|---|---|
| 278,437 | 5/1883 | Lancaster | 5/98.3 X |
| 841,902 | 1/1907 | Shumard | 294/152 X |
| 995,458 | 6/1911 | Harriman | 224/214 |
| 2,804,249 | 8/1957 | Manalo | 224/158 |
| 3,099,486 | 7/1963 | Scott | 297/465 |
| 3,132,779 | 5/1964 | Gray | 224/267 |
| 3,610,490 | 10/1971 | Smith | 224/214 X |
| 4,186,689 | 2/1980 | Alexander et al. | 119/102 |
| 4,402,440 | 9/1983 | Purtzer et al. | 224/159 X |
| 4,428,514 | 1/1984 | Elf | 224/160 X |
| 4,450,991 | 5/1984 | Gougeon | 224/159 |
| 4,556,016 | 12/1985 | Snell et al. | 119/102 |
| 4,559,906 | 12/1985 | Smith | 119/102 X |
| 4,579,264 | 4/1986 | Napolitano | 224/158 X |
| 4,759,311 | 7/1988 | Boyle | 119/96 |
| 4,778,091 | 10/1988 | Basto | 224/158 X |
| 4,881,684 | 11/1989 | Chinman | 294/157 X |
| 4,941,604 | 7/1990 | Nagareda | 224/160 |

FOREIGN PATENT DOCUMENTS

| | | | |
|---|---|---|---|
| 157374 | 3/1954 | Australia | 119/102 |
| 99137 | 1/1925 | Austria | 224/210 |
| 908005 | 5/1944 | France | 224/210 |
| 22301 | 9/1910 | United Kingdom | 119/102 |
| 2184091 | 6/1987 | United Kingdom | 119/102 |

Primary Examiner—Charles E. Phillips
Assistant Examiner—Glenn T. Barrett

[57] ABSTRACT

A flexible article carrier having a flexible rectangular body with reinforcing panel attached to it which by sewing can be formed into pockets. Three strap combinations are fixed to what is normally the outside of the carrier, the first is for mounting the carrier on a persons body, the second is holding the carrier in a folded article carrying position and the third is for endwise retention of a carried article. A measuring scale and weigh scale lifting loops are provided to gain information about the article which is detailed in a record book held in a further pocket on the outside. Stiffening stays in the mid portion of the carrier give added support to the carried article.

9 Claims, 2 Drawing Sheets

ARTICLE CARRIER

BACKGROUND OF THE INVENTION

The newborn of most animals including human beings are extremely fragile and must receive a great deal of tender loving care at least initially. With the profit margin in the cattle industry becoming smaller and expenses becoming larger one has to insure the survival of as many animals as possible. With the inclement weather conditions often experienced during calving it is mandatory that the newborns be rescued as soon as possible. To pick up one of these newborn calves which can be cold, wet and weighing up to 130 pounds is no mean task especially if one is prone to back problems. In an attempt to obviate these problems a search was made but nothing of any consequence was revealed. The common infant carrier enlarged and strengthened did not prove to be the answer.

SUMMARY OF THE INVENTION

The present invention provides a calf carrier designed to enable one to quickly and easily pick up and transport a newborn calf. A flexible rectangular body is provided which is normally reinforced by a flexible panel which is normally stitched to the body with the formation of pockets. Further reinforcement is achieved by stays between the body and panel. Adjustable carrying straps are provided on the outer side to mount the carrier on a human body. The free end of the flexible carrier body is then folded about the calf and releasably attached to the carrying straps. A further strap is provided on the outerside to retain the calf from endwise movement in the carrier. As is common in the livestock industry a record of the calf's weight, height and date of birth etc. are kept on record. To enhance the utility of the carrier a measurement scale is formed on one of the longer straps, loops are provided on the carrier body to engage a weighing scale and a further pocket is provided on the outer side to hold record books and the like.

In view of the above it is therefore considered a prime object of the present invention to provide a fast and efficient means for rescuing small animals from the elements.

A further object of the above invention is to provide a strong and versatile article carrier.

A further object of the above invention is to provide a carrier that enables freedom of arm movement for other purposes while carrying an object.

A further object of the instant invention is to provide for easy weighing and recording of an animals required birth data.

A still further object of the instant invention is the provision of a carrier that keeps the clothes of the user clean and dry.

These and other objects of the present invention will become readily apparent as the following description is read in conjunction with the accompanying drawings wherein like reference numerals indicate like elements throughout the several views.

DETAILED DESCRIPTION OF PREFERRED EMBODIMENT

Figure 1:
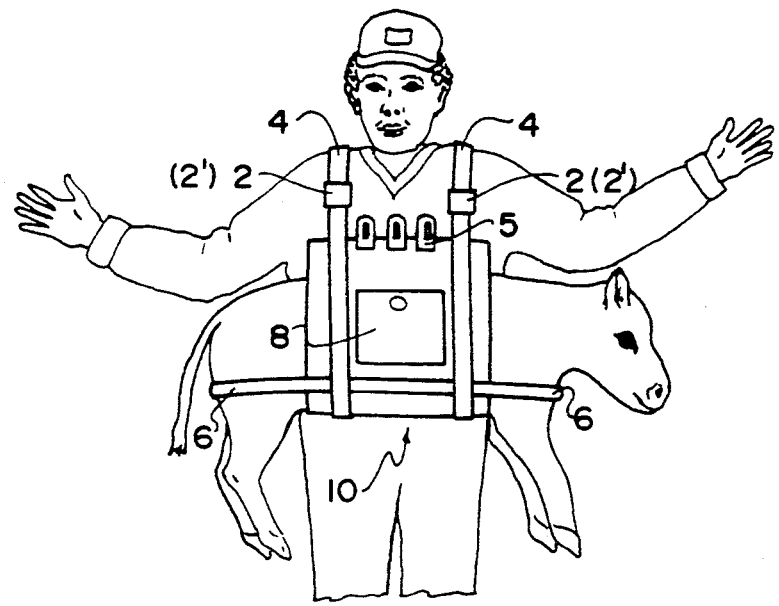
FIG. 1 is a frontal view of a person with a calf supported in the carrier.

In referring to the drawings in detail it should be noted that a side of the carrier body can be the outer side or the inner side while the outer periphery will be considered as formed of edges due to the planar nature of the body.

Referring now to FIG. 1 there is shown a person with the carrier 10 mounted on his body and supporting a calf in the carrying position. The carrier 10 is held by its wide longitudinal carrier straps 4 which pass over the shoulders of a person, are crossed at the back and then their end buckle portions 1' snap into edge located cooperating buckle portions 1. The person then kneels down lays the calf on the carrier body 15 folds the free end up around the calf and snaps the cooperating ends 2, 2' together. The buckle ends 3, 3' of strap 6 are engaged to restrain the calf from endwise movement thereby freeing ones hands for any required further operation.

Figure 2:
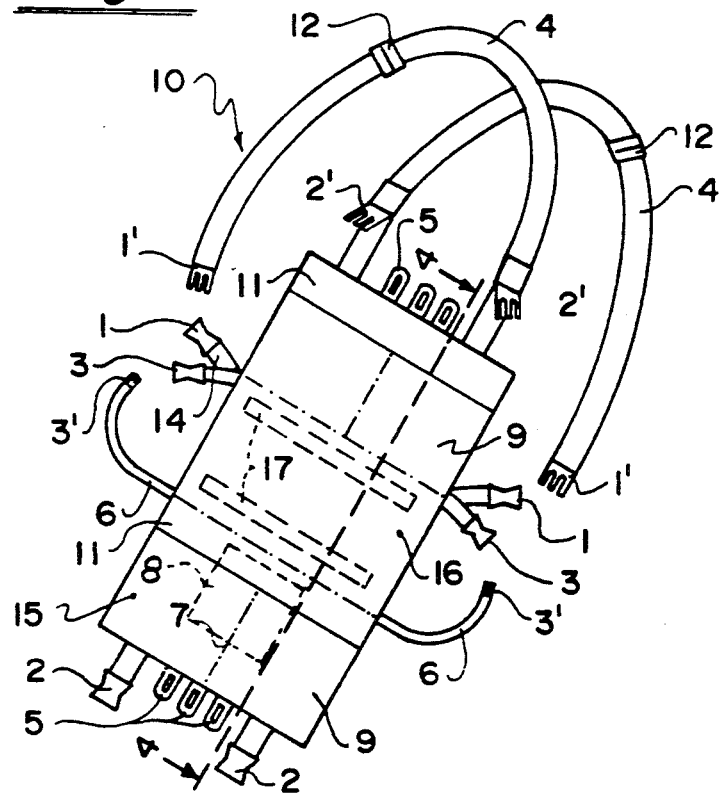
FIG. 2 is a plan view of what is normally considered as the inner side of the carrier.

Now referring to FIG. 2 we have a top plan view of the carrier 10 with the inner side exposed. A carrier body 15 is overlapped at each end and has laid thereon in an overlapping relationship a reinforcing panel 16 as more clearly shown in FIG. 4. The reinforcing panel 16 is stitched as at 7 so that the panel 16 will form with the body 15 several pockets for carrying ear tags, dehorning paste and the like that will be used while working with the cattle. Such accessories would not be carried in the pockets 9 when carrying a calf. The reinforcing panel 16 adds to the strength and rigidity of the carrier while ensuring that the users clothes remain clean and dry. Further reinforcing is achieved by the placing of normally flexible plastic stays 17 between the body 15 and the panel 16 and held in position by stitching. The carrier body 15 with attached panel 16 is supported on a persons body by straps 4 which are stitched to the body 15 on the outer side to ensure a smooth comfortable surface on the inner side. The straps 4 extend in spaced parallel relationship along the carrier body 15 and beyond at each end. At one end the extensions are adjustable by buckles 12 and terminate in male buckle portions 1' and carry further male buckle portions 2' near the carrier body 15. At the other end the extensions carry female buckle portions 2 which are engaged by male buckle portions 2' after the carrier body 15 has encircled the calf or article to be carried. This of course takes place after the carrier has been mounted on a persons body. Straps 14 and 6 stitched to carrier body 15 are transverse to the parallel straps 4 and are in a spaced parallel relationship to one another. Strap 14 extends beyond the carrier body 15 and terminates in female buckle portions 1 which are engaged by male buckle portions 1' to support the carrier body on a persons body. Strap 6 extends beyond the carrier body 15 and terminates in male buckle portions 3' which engage female buckle portions 3 attached to the edges of the carrier body 15 so that a restraining means is provided for both the front and back end of the calf or article being carried. The overlapping of the carrier body material and the reinforcing panel provide flaps 11 for the pockets 9. At each end of the carrier body are weight lifting loops 5 which when the carrier body is wrapped about the calf cooperate to be engageable by a weigh scale hook. This is most convenient when one has the calf in the carrying position. More than one pair of weight lifting loops has been provided for hand lifting of the calf to be weighed when the carrier has been removed from a persons body.

Figure 3:
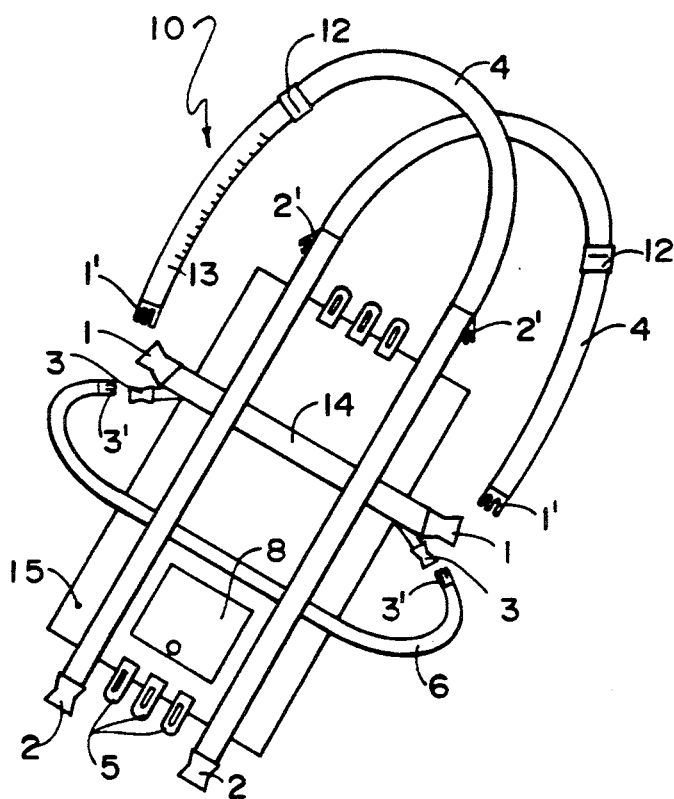
FIG. 3 is a plan view of what is normally considered as the outer side of the carrier.

Now referring to FIG. 3 we have a plan view of the outer side of the carrier 10 which shows the location of all the straps as applied to the carrier body 15. What has been added is a measuring scale 13 and outside pocket 8. When the newborn of any species arrives it is always advantageous establish statistics as to size and weight to enable one to determine if or how much progress has been made as time passes. The measuring scale 13 formed on one of the longer straps 4 enables one to establish the size of any of the body components while the weight lifting loops 5 assist one in establishing the weight. Recording equipment such as a recording book and pencil are made readily available by storage in the convenient outside pocket 8 fastened to the carrier body 15.

Figure 4:
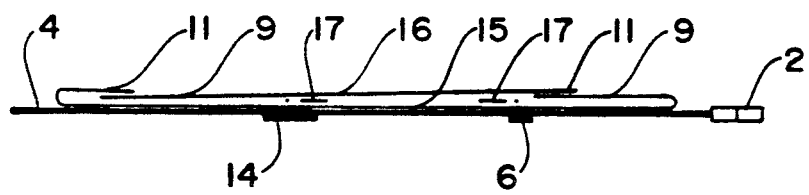
FIG. 4 is a schematic cross section of the carrier as seen from the cutting plane 4—4 in FIG. 2.

In reference to FIG. 4 which is a schematic of the cutting plane 4—4 in FIG. 2 it is indicated how the carrier body 15 and reinforcing panel 16 overlap forming the pockets 9 and pocket flaps 11. The reinforcing stays 17 are shown in the mid portion of the body 15 between the body 15 and panel 16 where they are held in position by stitching.

OPERATION

When a calf or any such other animal is newly born they are extremely wet and slimy and they can be born under inclement weather conditions. To ensure that the newborn does not perish it must be immediately placed under ideal conditions. The animal must be carried by one means or another depending on the distance to be travelled. Prior to the instant invention the animal was manually picked up placing a considerable strain on a persons back as well as making his clothes wet and dirty. To obviate all such problems applicants device has proven very successful.

To pick up an animal one places the carrier body 15 with the strap attached side against the front part of a persons body, the longitudinal straps 4 with male buckle portions 1' are then placed over the shoulders rearwardly, crossed over and engaged with female buckle portions 1. The length is adjusted as necessary. The person then kneels down, places the animal on the carrier body 15, wraps the carrier body 15 about the animal so that female buckle portions 2 may now be engaged by male buckle portions 2'. To prevent endwise movement the male buckle portions 3' are now engaged with female buckle portions 3. The animal is now securely held and may be transported by the person walking, riding horseback, riding a recreational vehicle or the like, since the hands are now free to carry out other functions.

The article carrier as detailed above has many uses such as carrying an armful of wood or a bundle of shingles on to a roof etc. The specific use is limited only by ones imagination, the method of operation being identical.

Although the invention has been described with a certain degree of particularity it is understood that the present disclosure has been made only by way of example and that numerous changes in the details of construction and the combination and arrangement of parts may be resorted to without departing from the spirit and scope of the invention as hereinafter claimed.

What I claim is:

1. A carrier for new born calves comprising in combination a rectangular flexible carrier body, a reinforcing panel stitched to said carrier body thereby providing rigidity and strength and forming therewith by sewing, article holding pockets, two wide longitudinally mounted carrier straps stitched to said carrier body in parallel spaced relationship and having on one pair of extending ends a male buckle portion and on the other pair of extending ends a female buckle portion, a further wide carrier strap stitched to said carrier body transverse to the longitudinally mounted carrier straps and having on each extending end thereof a female buckle portion to cooperate with the male buckle portions of said longitudinally mounted carrier straps, a narrow female buckle portion attached at each edge of said carrier body where the further wide transverse carrier strap extends from said carrier body, a narrow carrier strap stitched to said carrier body in spaced parallel relationship to said further wide carrier strap and having on each end thereof a narrow male buckle portion, lifting loops on each end of said carrier body for engagement by a weigh scale hook, a measuring scale formed on one of said wide longitudinally mounted carrier straps, all of the straps being applied to one side of said carrier body, an outside pocket attached to the carrier body on the strap applied side so that in use it is furthest from the users body, and wherein the wide longitudinally mounted carrier straps with the extending ends carrying said male buckle portions attached thereto being adjustable and of considerable length have additional wide male buckle portions attached thereto near said carrier body to engage said female buckle portion on the extending ends of the wide longitudinally mounted carrier straps.

2. The carrier as claimed in claim 1 further including reinforcing supporting stays between said carrier body and said reinforcing panel.

3. The carrier as claimed in claim 2 wherein there are three said lifting loops at each end of said carrier body.

4. The carrier as claimed in claim 3 wherein the carrier body, reinforcing panel and straps are a washable nylon.

5. An article carrier comprising in combination a carrier body formed of a flexible sheet, a first strap and a second strap attached to said carrier body in spaced parallel relationship and extending outwardly from said body, a third strap and a fourth strap attached to said carrier body in spaced parallel relationship and being transverse to said first strap and said second strap and extending outwardly from said carrier body, said first strap and said second strap each having a male buckle portion at a first end and a female buckle portion at a second end, one of said third strap and said fourth strap having female buckle portions at each end, the other of said third strap and said fourth strap having male buckle portions at each end, a further two female buckle portions each one attached to and extending from the carrier body to cooperatively engage the other of said third strap and said fourth strap having male buckle portions at each end, a male buckle portion attached to both of said first strap and said second strap on the outwardly extensions from said carrier body between said carrier body and said first and second male buckle portions.

6. An article carrier as claimed in claim 5 further comprising a reinforcing panel attached to one side of said carrier body and forming therewith several article carrying pockets.

7. An article carrier as claimed in claim 6 further including reinforcing supporting stays between said flexible sheet and said reinforcing panel.

8. An article carrier as claimed in claim 6 wherein the carrier body and said reinforcing panel are rectangular in shape with said first strap and said second strap being placed in the longitudinal direction of the rectangle.

9. An article carrier as claimed in claim 8 further including lifting loops attached to both ends of said rectangular carrier body, a measuring scale formed on one of said first and second straps and an outside pocket on the side carrier body opposite said reinforcing panel.

* * * * *